United States Patent
Hayashi

(10) Patent No.: US 10,313,238 B2
(45) Date of Patent: Jun. 4, 2019

(54) COMMUNICATION SYSTEM, COMMUNICATION METHOD, AND NON-TRANSITIORY COMPUTER READABLE MEDIUM STORING PROGRAM

(71) Applicant: NEC CORPORATION, Tokyo (JP)

(72) Inventor: Takeshi Hayashi, Tokyo (JP)

(73) Assignee: NEC CORPORATION, Minato-Ku, Tokyo (JP)

( * ) Notice: Subject to any disclaimer, the term of this patent is extended or adjusted under 35 U.S.C. 154(b) by 0 days.

(21) Appl. No.: 15/547,946

(22) PCT Filed: Feb. 19, 2016

(86) PCT No.: PCT/JP2016/000894
§ 371 (c)(1),
(2) Date: Aug. 1, 2017

(87) PCT Pub. No.: WO2016/139910
PCT Pub. Date: Sep. 9, 2016

(65) Prior Publication Data
US 2018/0034733 A1    Feb. 1, 2018

(30) Foreign Application Priority Data

Mar. 2, 2015    (JP) .................................. 2015-040246

(51) Int. Cl.
| H04L 12/66 | (2006.01) |
| H04L 12/741 | (2013.01) |
| H04L 29/06 | (2006.01) |
| H04L 12/717 | (2013.01) |
| H04L 12/721 | (2013.01) |

(52) U.S. Cl.
CPC .......... H04L 45/745 (2013.01); H04L 12/66 (2013.01); H04L 45/38 (2013.01); H04L 45/42 (2013.01); H04L 63/0245 (2013.01); H04L 63/1458 (2013.01)

(58) Field of Classification Search
CPC ... H04L 45/745; H04L 45/42; H04L 63/1458; H04L 45/38; H04L 63/0245
See application file for complete search history.

(56) References Cited

U.S. PATENT DOCUMENTS

| 2013/0064243 A1* | 3/2013 | Akiyoshi ................ H04L 45/38 370/389 |
| 2013/0259052 A1 | 10/2013 | Akiyosh |
| 2017/0093734 A1* | 3/2017 | Sasaki ..................... H04L 47/32 |

FOREIGN PATENT DOCUMENTS

| JP | 2003-283571 A | 10/2003 |
| JP | 2003-289337 A | 10/2003 |

(Continued)

OTHER PUBLICATIONS

Casado, Ethane:Taking Control of the Enterprise.*

(Continued)

Primary Examiner — Lakeram Jangbahadur
(74) Attorney, Agent, or Firm — Sughrue Mion, PLLC

(57) ABSTRACT

A communication system (1000) includes a communication apparatus (100) and a communication control apparatus (200). The communication apparatus (100) includes a packet receiving unit (101) for receiving a packet, a packet processing unit (105) for processing the packet matching with a predetermined condition by a method associated with the condition, and a Packet-in transmission unit (103) for transmitting a first notification when the packet does not match with the condition. The communication control apparatus (200) includes a packet-in receiving unit (201) for receiving the first notification, and a communication limit instruction unit (205) for limiting the reception of the packet at the packet receiving unit (101) when an index based on the number of times of reception of the first notification satisfies a first condition.

6 Claims, 3 Drawing Sheets

(56) References Cited

FOREIGN PATENT DOCUMENTS

| JP | 2005-39721 A | 2/2005 |
|---|---|---|
| JP | 2006-100874 A | 4/2006 |
| JP | 2006-164038 A | 6/2006 |
| JP | 2013-070325 A | 4/2013 |
| JP | 2014-504811 A | 2/2014 |

OTHER PUBLICATIONS

Sherwood, FlowVisor:A Network Virtualization Layer.*
Rob Sherwood, et al., "Flow Visor: A Network Virtualization Layer", Openflow Technical Report, Available at http://OpenFlowSwitch.org/downloads/technicalreports/openflow-tr-2009-_1_-flowvisor.pdf, Oct. 14, 2009, pp. 1-14.
Martin Casado, et al., "Ethane: Taking Control of the Enterprise", ACM SIGCOMM Computer Communication Review,<URL:http://www.sigcomm.org/sites/default/files/ccr/papers/2007/October/1282427-1282382.pdf>Oct. 2007, pp. 1-12, vol. 37, issue 4.
Rodrigo Braga, et al., "Lightweight DDoS flooding attack detection using NOX/OpenFlow", 35th Annual IEEE Conference on Local Computer Networks, URL:http://ieeexplore.Ieee.org/stamp/stamp.jsp?tp=&arnumber=5735752, Oct. 2010, pp. 408-415.
International Search Report for PCT/JP2016/000894 dated Mar. 15, 2016 [PCT/ISA/210].
Written Opinion for PCT/JP2016/000894 dated Mar. 15, 2016 [PCT/ISA/237].
Communication dated Apr. 2, 2019 issued by the Japanese Patent Office in counterpart application No. 2015-040246.

* cited by examiner

COMMUNICATION SYSTEM, COMMUNICATION METHOD, AND NON-TRANSITIORY COMPUTER READABLE MEDIUM STORING PROGRAM

CROSS REFERENCE TO RELATED APPLICATIONS

This application is a National Stage of International Application No. PCT/JP2016/000894 filed Feb. 19, 2016, claiming priority based on Japanese Patent Application No. 2015-040246 filed Mar. 2, 2015, the contents of all of which are incorporated herein by reference in their entirety.

TECHNICAL FIELD

The present invention relates to a communication system, a communication method and a program and relates to, for example, a technique of efficiently dealing with a large number of accesses in a network including a dynamic route controlling function.

BACKGROUND ART

A network control technique which is called Software Defined Networking (SDN) is known. For example, OpenFlow (registered trademark) is a typical technique of the SDN, and enables software to realize flexible network management by separating a network route controlling function from a packet transferring function. More specifically, OpenFlow is composed of a control application, a controller which performs network route control, and a switch which performs packet transfer processing according to an instruction of the controller.

Meanwhile, securing network safety is an important task for network administrators. In recent years in particular, DoS (Denial of Service) attacks transmitting a large amount of traffic to a target server by operating multiple terminals have been increasing. A network under the DoS attack causes problems such as a decrease in processing performances of a router and a firewall, a decrease in processing performance of a target server, and significant consumption of disk resources due to enormous logs. Further, attackers usually spoof transmission source addresses, and therefore network administrators generally have difficulty in accurately specifying the attackers. Therefore, it is not possible to take effective measures for excluding the attackers.

When there are a large number of accesses such as DoS attacks on a network including the dynamic route controlling function such as OpenFlow in particular in a short time, a switch generates a great number of new flow inquiries (Packet-in) to a controller in a short time. In this case, if no countermeasure is taken, an excessive processing load is applied to the controller or a packet transfer destination server, and the controller or the packet transfer destination server is thus likely to become unable to perform processing.

In this regard, a method has been proposed for suppressing loads applied to a switch by causing a controller to authenticate (accessibility determination) a packet distribution source user and to determine and discard unauthorized packets based on a defined pattern when a DoS attack on a system which controls a network by using the OpenFlow technique occurs (see, for example, Patent Literature 1).

CITATION LIST

Patent Literature

Patent Literature 1: Japanese Unexamined Patent Application Publication No. 2013-070325

SUMMARY OF INVENTION

Technical Problem

However, distribution source user authentication processing and unauthorized packet determination processing causes an information processing cost to be incurred. Particularly, when a large number of unauthorized packets instantaneously reaches a switch due to DoS attacks, and a large number of Packet-in) are transmitted from a switch to a controller, an excessive load of the authentication processing or the determination processing is applied to the controller and is thus it likely to become unable to perform processing. Hence, an efficient countermeasure against DoS attacks is demanded.

The present invention has been made to solve the above problem, and an object of the present invention is to provide a communication system, a communication method and a program which are robust against a large number of accesses.

Solution to Problem

A communication system according to the present invention includes:
a communication apparatus that includes:
packet receiving means for receiving a packet;
packet processing means for processing the packet matching with a predetermined condition by a method associated with the condition; and
Packet-in transmitting means for transmitting a first notification when the packet does not match with the condition; and
a communication control apparatus that includes:
Packet-in receiving means for receiving the first notification; and
communication limit instructing means for limiting reception of the packet at the packet receiving means when an index based on the number of times of reception of the first notification satisfies a first condition.

A communication method according to the present application includes:
a packet receiving step of, at a communication apparatus, receiving a packet;
a packet processing step of, at the communication apparatus, processing the packet matching with a predetermined condition by a method associated with the condition;
a Packet-in transmitting step of, at the communication apparatus, transmitting a first notification when the packet does not match with the condition;
a Packet-in receiving step of, at a communication control apparatus, receiving the first notification; and
a communication limit instructing step of, at the communication control apparatus, limiting reception of the packet in the packet receiving step when an index based on the number of times of reception of the first notification satisfies a first condition.

A program according to the present invention is a program causing one of a communication apparatus and a communication control apparatus to execute the steps of one of the communication apparatus and the communication control apparatus.

Advantageous Effects of Invention

According to the present invention, it is possible to provide a communication system, a communication method and a program which are robust against a large amount of accesses.

DESCRIPTION OF EMBODIMENTS

Figure 1:
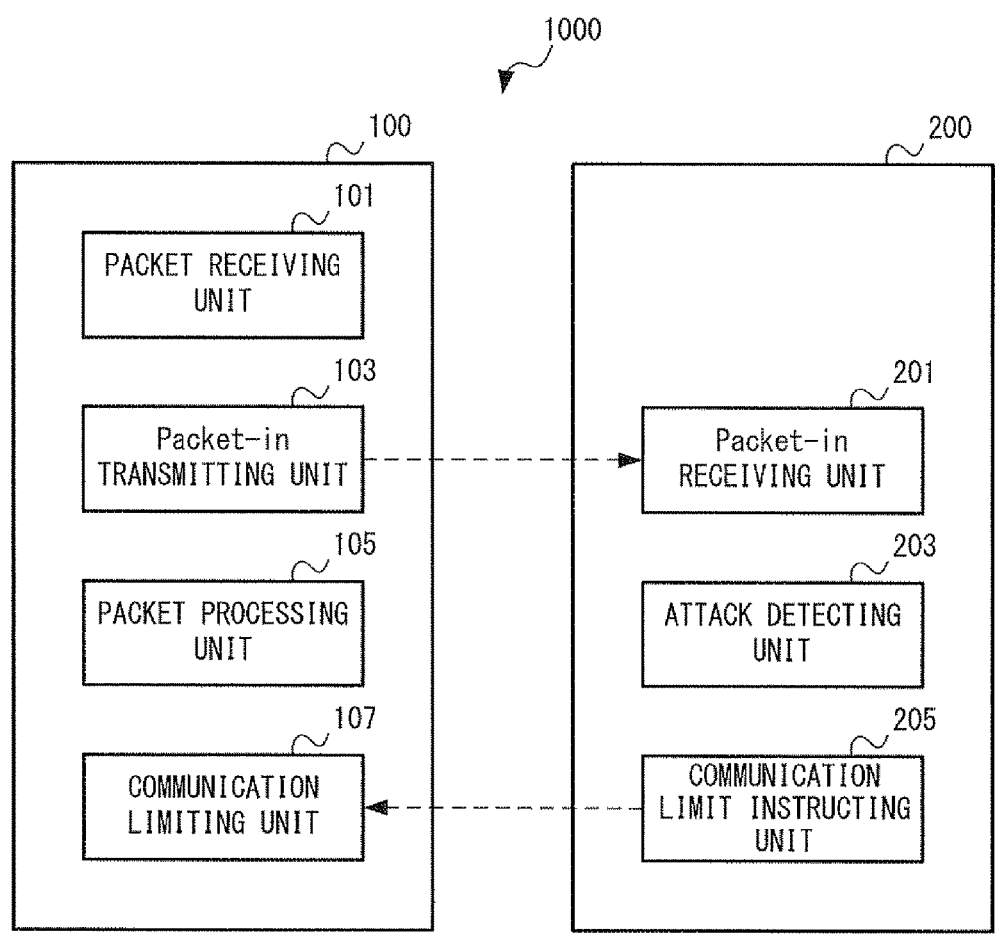
FIG. 1 is a view illustrating a configuration of a communication system 1000 according to an embodiment.

First, a background and an outline of the present embodiment will be described to make it easy to understand the embodiment of the present invention.

The present embodiment assumes a network which includes a dynamic route controlling function such as OpenFlow. In such a network, a switch holds in advance a set of rules (referred to as flows below) in which conditions for identifying packets and packet processing methods matching the conditions are associated. When the switch receives the packet, the switch performs processing for transferring the packet to a predetermined transfer destination or discarding the packet based on this flow.

In this regard, when the switch receives a packet which does not match with the condition defined in advance for the flow, i.e., when it receives an undefined packet, the switch transmits an inquiry to the controller asking about the packet processing method (new flow inquiry, i.e., Packet-in). The controller then generates a new flow according to a Packet-in, and returns the generated flow to the switch. Further, the switch processes the packet based on the new flow received from the controller.

When such a network including the dynamic route controlling function receives a large number of accesses such as DoS attacks, the switch generates a large number of Packet-in for the controller. In this case, the controller may need to perform a large number of types of processing, such as generation of new flows, and is thus likely to become unable to perform control due to an excessive processing load.

In this regard, during a normal access, a large amount of data is not transmitted to a specific server, i.e., the above large number of Packet-in is not generally generated as described above. In this case, when a flow is created on a first access, the switch transfers data based on this flow on subsequent accesses. That is, Packet-in is generated for the controller only at a first time, and the controller is not involved in subsequent continuous packet transfers.

Meanwhile, a large number of unauthorized accesses such as DoS attacks causes a flood of a large number of accesses to which a previously created flow cannot be applied, to the switch in a short time due to the reason that a transmission source address is spoofed (e.g., the transmission source address is changed at random). Hence, the switch generates a large number of Packet-in for the controller.

The inventors thought that, when a large number of unauthorized accesses is generated in a short time, limiting a band at an input port of the switch by executing a RateLimit function (a function of setting a processing amount per unit time to the switch) would be effective as a countermeasure against such a problem. As a method for realizing the countermeasure, the inventors have invented a method for counting the number of Packet-in received by the controller in a fixed time and causing the switch to activate the RateLimit function when the number counted exceeds a predetermined threshold.

A specific embodiment to which the present invention is applied will be described in detail below with reference to the drawings. First, a configuration of a communication system 1000 according to the embodiment of the present invention will be described with reference to FIG. 1.

The communication system 1000 includes a communication apparatus 100 and a communication control apparatus 200. The communication system 1000 is a network system which includes a dynamic route controlling function such as OpenFlow, and the communication apparatus 100 operates as a switch and the communication control apparatus 200 operates as a controller.

Figure 3:
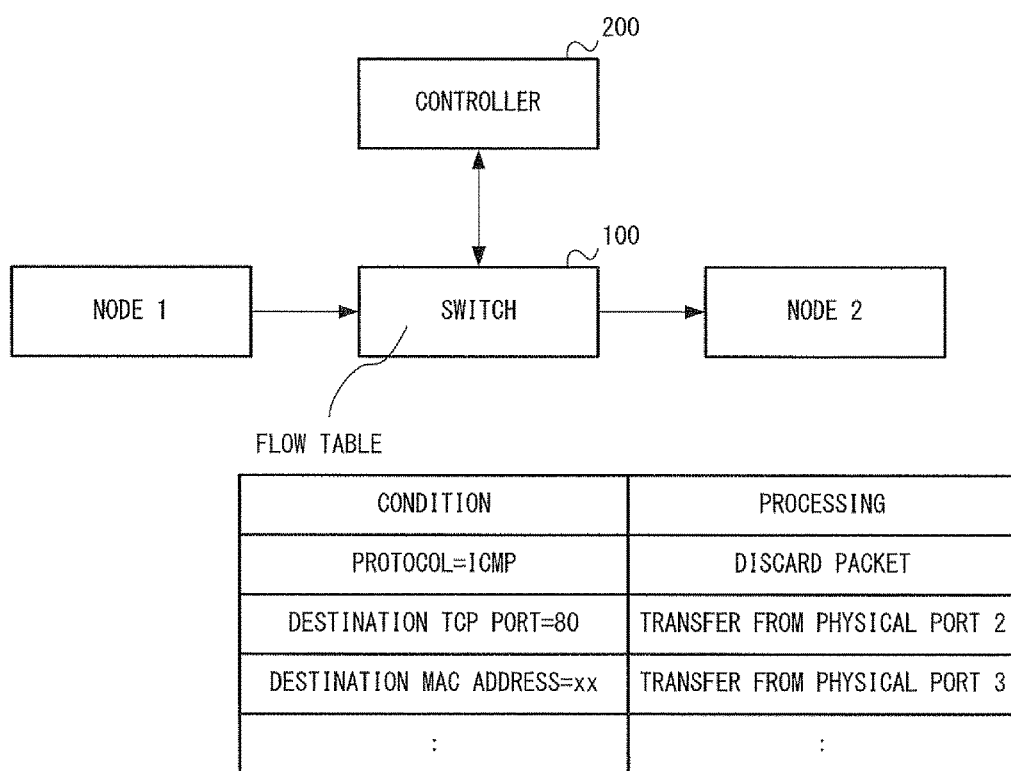
FIG. 3 is a view illustrating a use example of a communication system 1000 according to an embodiment.

As illustrated in FIG. 3, the communication apparatus 100 is connected with the communication control apparatus 200 and a plurality of nodes (e.g., a node 1 and a node 2). A plurality of nodes are packet transmission sources or packet transmission destinations of the communication apparatus 100. Subsequently, a case where the node 1 is the packet transmission source and the node 2 is the packet transmission destination will be described as an example in the present embodiment.

Further, as illustrated in FIG. 3, the communication apparatus 100 holds a flow table which defines conditions of received packets and packet processing methods associated with the conditions. For example, according to the flow table in FIG. 3, the communication apparatus 100 discards a packet whose protocol is ICMP. Further, when the communication apparatus 100 receives a packet from a destination TCP port 80, the communication apparatus 100 sends the packet from a physical port 2.

The communication apparatus 100 includes a packet receiving unit 101, a Packet-in transmitting unit 103, a packet processing unit 105 and a communication limiting unit 107.

The packet receiving unit 101 receives the packet from the transmission source, and determines whether or not the received packet matches with one of the conditions defined in the flow table.

When the received packet does not match with any one of the conditions defined in the flow table, the Packet-in transmitting unit 103 transmits a new flow inquiry (Packet-in) to the communication control apparatus 200.

The packet processing unit 105 processes the received packet according to the flow table.

The communication limiting unit 107 sets a communication limit by setting a traffic limit (rate limit), blocking packets of specific transmission source addresses, blocking specific communication ports or blocking a network interface according to an instruction of the communication control apparatus 200.

The communication control apparatus 200 includes a Packet-in receiving unit 201, an attack detecting unit 203 and a communication limit instructing unit 205.

The Packet-in receiving unit 201 receives a new flow inquiry (Packet-in) from the communication apparatus 100.

The attack detecting unit 203 determines whether or not to set the communication limit according to the number of Packet-in received from the communication apparatus 100. Typically, when the number of Packet-in exceeds a predetermined threshold, it is determined that it is necessary to set the communication limit.

The communication limit instructing unit 205 transmits instructions regarding contents of the communication limit which needs to be set to the communication apparatus 100. In the present embodiment, the communication limit instructing unit 205 instructs the communication apparatus 100 to set a traffic limit (rate limit). Subsequently, if necessary, the communication limit instructing unit 205 analyzes the packet whose Packet-in has been notified, and instructs the communication apparatus 100 to further set the communication limit.

Figure 2:
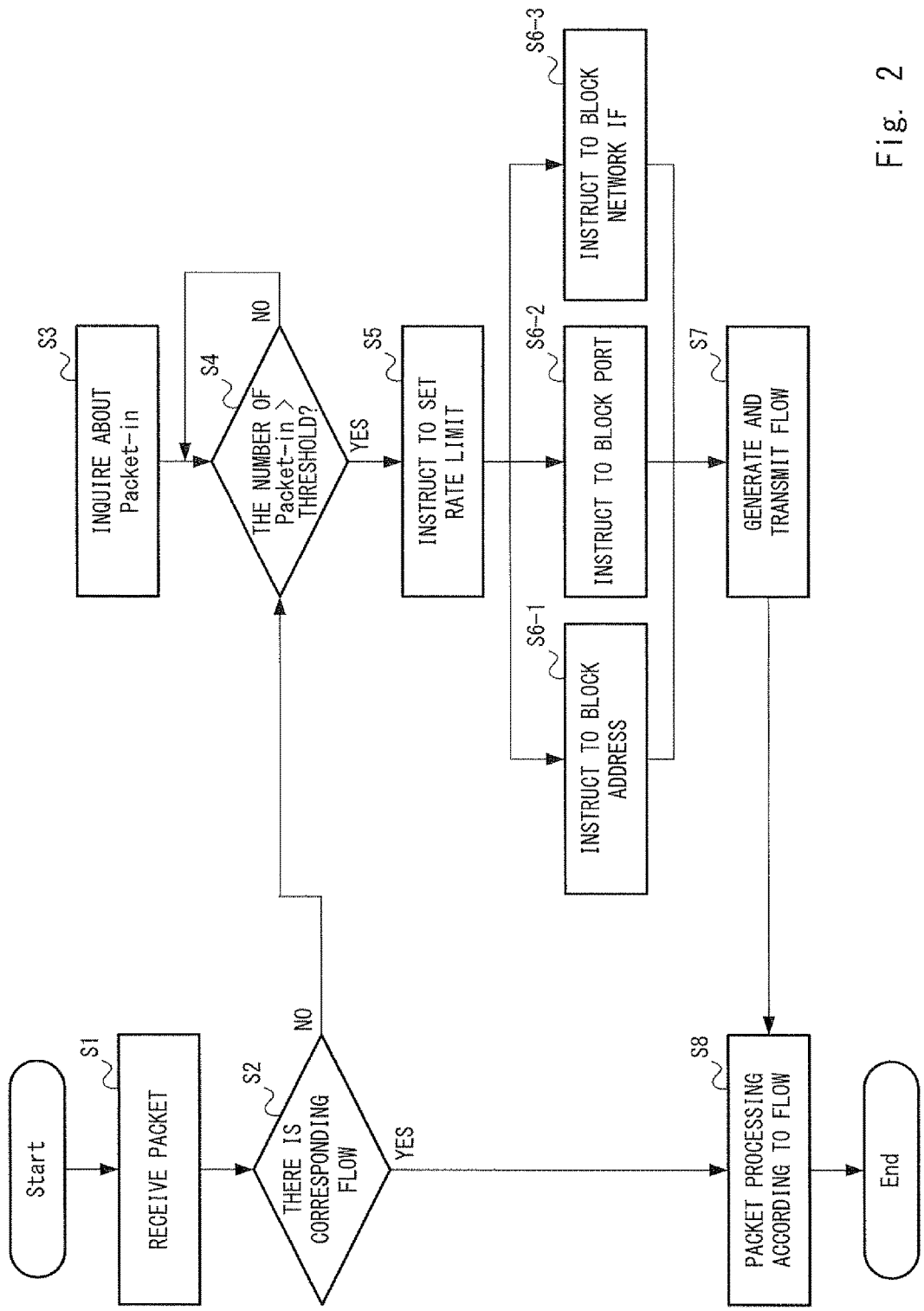
FIG. 2 is a view illustrating an operation of a communication system 1000 according to an embodiment.

Subsequently, an operation of the communication system 1000 according to the first embodiment of the present invention will be described with reference to FIG. 2.

S1: Reception of Packet

The packet receiving unit 101 receives a packet from the node 1.

S2: Determination on Whether or not There is Corresponding Flow

The packet receiving unit 101 analyzes the received packet, and determines whether or not the packet matches with the condition defined in the flow table. When the packet matches with the condition, the flow moves to S8. When the packet does not match with the condition, the flow moves to S3.

S3: Inquiry about Packet-In

The communication apparatus 100 does not have a flow associated with the received packet, and therefore cannot process the received packet. Hence, the Packet-in transmitting unit 103 transmits a new flow inquiry (Packet-in) to the Packet-in receiving unit 201 of the communication control apparatus 200, and requests the flow associated with the received packet.

The Packet-in receiving unit 201 receives Packet-in from the Packet-in transmitting unit 103.

S4: Determination on Packet-in

The attack detecting unit 203 counts the number of Packet-in received from the communication apparatus 100. More specifically, for example, a timer measures a predetermined time and, when the predetermined time passes, the attack detecting unit 203 can repeat processing of outputting the number of Packet-in in the predetermined time, and resetting the timer.

Further, when the number of Packet-in received in a fixed time exceeds a predetermined threshold, the attack detecting unit 203 determines that a DoS attack has occurred in the communication apparatus 100. In this case, it is preferable to set as a threshold the number of Packet-in which is empirically impossible in case of a normal access. In this regard, an index used for this determination is not limited to this index, and an arbitrary index such as an increase rate of the number of Packet-in based on the number of Packet-in may be used.

S5: Instruction of Rate Limit

The communication limit instructing unit 205 instructs the communication apparatus 100 to limit a rate when it is determined that the DoS attack on the communication apparatus 100 has occurred. Typically, the communication limit instructing unit 205 suppresses an upper limit of a packet amount which can be processed by the communication apparatus 100 per unit time by executing a RateLimit command with respect to the communication apparatus 100. Consequently, it is possible to suppress the received packet amount in the communication apparatus 100, and, consequently, prevent generation of the amount of Packet-in which cannot be processed in the communication control apparatus 200. Consequently, it is possible to avoid a situation that the communication control apparatus 200 becomes unable to perform processing.

S6-1, S6-2 or S6-3:

Subsequently, the communication limit instructing unit 205 analyzes the received packet whose Packet-in has been notified, and tries to detect characteristics of the attack. Further, a flow or an instruction which can filter the characteristics is generated. Even when a transmission source IP address of the received packet is spoofed as a different address every time, if a transmission source MAC address is common, it is possible to generate a flow of discarding the packet whose MAC address is the transmission source. Alternatively, if the destination TCP port of the received packet is common, it is possible to generate an instruction to block the port.

Alternatively, the communication limit instructing unit 205 may generate an instruction to block the network interface of the communication apparatus 100 for a fixed time. This is because the attacks stop or weaken in this fixed time. In this case, the network interface of the communication apparatus 100 needs to recover after the fixed time passes. More specifically, for example, the communication limiting unit 107 of the communication apparatus 100 can activate the timer when the network interface is blocked, and cause the network interface to recover after the predetermined time passes. Alternatively, the communication limit instructing unit 205 of the communication control apparatus 200 may monitor a processing load of the communication control apparatus 200, and generate an instruction to recover the network interface for the communication limiting unit 107 when the load is the threshold or less.

In this regard, arbitrary one of three processes in S6-1, S6-2 and S6-3 may be performed or these processes may be optionally combined and executed. Alternatively, another arbitrary communication limiting method may be optionally employed.

S7: Generation and Transmission of Flow

The communication limit instructing unit 205 transmits the flow or the instruction generated in S6-1, S6-2 or S6-3 to the communication limiting unit 107. The communication limiting unit 107 writes the received flow in the flow table.

S8: Packet Processing According to Flow

The packet processing unit 105 processes the received packet according to the flow table. Further, the communication limiting unit 107 executes the instruction received from the communication limit instructing unit 205.

According to the present embodiment, the communication control apparatus 200 determines that the DoS attack has occurred when the number of Packet-in sent from the communication apparatus 100 satisfies the predetermined condition. Consequently, the communication control apparatus 200 detects the occurrence of the DoS attacks by using a simple index which is the number of Packet-in, so that it is possible to suppress a processing load. Further, Packet-in is sent only when there is no appropriate flow in the communication apparatus 100, so that the communication control apparatus 200 does not need to analyze all packets to detect attacks, and it is possible to suppress a processing load.

Furthermore, according to the present embodiment, the communication control apparatus 200 sets the rate limit on the communication apparatus 100 when detecting DoS attacks. Consequently, it is possible to prevent Packet-in which cannot be processed from causing a situation that the communication control apparatus 200 becomes unable to perform processing. Further, it is possible to suppress a processing load at a packet transfer destination, too.

Furthermore, according to the present embodiment, the communication control apparatus 200 instructs the communication apparatus 100 to set a flow for dealing with attacks and set various communication limits when detecting DoS attacks. Consequently, it is possible to exclude attack packets in the communication apparatus 100 and prevent a processing load from being applied to the communication control apparatus 200.

Generally, once the communication control apparatus 200 which is the controller and a server machine which is the node 2 become unable to perform processing, it is not easy to recover the communication control apparatus 200 and the server machine. Hence, in the present embodiment, certain processing capability is secured by limiting traffic applied to the communication control apparatus 200. Then, when the communication control apparatus 200 can analyze characteristics of attack packets, a rule for excluding the attack packet is set to the communication apparatus 100 to exclude an influence of the attacks on the communication control apparatus 200.

Other Embodiment

In this regard, the present invention is not limited to the embodiment, and can be optionally changed without departing from the scope of the present invention. In the present embodiment, when, for example, the number of Packet-in exceeds the threshold, the communication control apparatus 200 instructs the communication apparatus 100 to activate the RateLimit function. However, when, for example, the switch and the controller are provided in the same apparatus, the controller side can also directly activate the RateLimit function by using any means such as a system call.

Further, the RateLimit function may not be finely controlled by the communication control apparatus 200 and may be activated by the communication apparatus 100 before start of communication. Alternatively, the communication apparatus 100 may count the number of received packets which do not match with a flow is counted, and activate the RateLimit function when an index based on the number of counts satisfies a predetermined condition. Consequently, it is possible to further reduce a processing load of the communication control apparatus 200.

Further, in the above exemplary embodiments, although the present invention has been described as being mainly a hardware configuration, it is not limited to this, and the present invention can be achieved by causing a CPU (Central Processing Unit) to execute arbitrary processes by a computer program. In this case, the computer program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The present application claims priority rights of and is based on Japanese Patent Application No. 2015-040246 filed on Mar. 2, 2015 in the Japanese Patent Office, the entire contents of which are hereby incorporated by reference.

INDUSTRIAL APPLICABILITY

The present invention can be used for a network including a dynamic route controlling function.

REFERENCE SIGNS LIST

1000 COMMUNICATION SYSTEM
100 COMMUNICATION APPARATUS
101 PACKET RECEIVING UNIT
103 Packet-in TRANSMITTING UNIT
105 PACKET PROCESSING UNIT
107 COMMUNICATION LIMITING UNIT
200 COMMUNICATION CONTROL APPARATUS
201 Packet-in RECEIVING UNIT
203 ATTACK DETECTING UNIT
205 COMMUNICATION LIMIT INSTRUCTING UNIT

The invention claimed is:

1. A communication system comprising a communication apparatus and a communication control apparatus,
    wherein the communication apparatus comprises:
    a first receiver configured to receive a packet;
    a first processor configured to process the packet matching with a predetermined condition by a method associated with the predetermined condition, wherein the predetermined condition is defined by a flow table; and
    a transmitter configured to transmit a first notification when the packet does not match with the predetermined condition; and
    wherein the communication control apparatus comprises:
    a second receiver configured to receive the first notification; and
    a second processor configured to limit a rate reception of the packet at the first receiver of the communication apparatus when an index based on a number of times of reception of the first notification satisfies a first condition,
    wherein the second processor of the communications control apparatus causes the first receiver of the communication apparatus to stop receiving the packet when the index based on a number of times of reception of the first notification satisfies the first condition, and
    wherein the second processor of the communication control apparatus causes the first receiver of the communication apparatus to resume receiving the packet after a predetermined time passes when the first receiver of the communication apparatus stops receiving the packet.

2. The communication system according to claim 1, wherein the second processor of the communication control apparatus is configured to activate a timer when the second processor causes the first receiver of the communication apparatus to stop.

3. The communication system according to claim 1, wherein the second processor of the communication control apparatus generates the predetermined condition and the processing method of the packet for which the first notification is transmitted, and notifies the first processor of the communication apparatus of the predetermined condition and the processing method.

4. The communication system according to claim 1, wherein the first index is determined according to capability of one of the communication control apparatus and a transmission destination of the packet.

5. A communication method comprising:
   at a first receiver of a communication apparatus, receiving a packet;
   at the communication apparatus, processing the packet matching with a predetermined condition by a method associated with the predetermined condition, wherein the predetermined condition is defined by a flow table;
   at the communication apparatus, transmitting a first notification when the packet does not match with the predetermined condition;
   by a communication control apparatus:
      receiving the first notification by a second receiver;
      limiting a rate reception of the packet in receiving the packet at the communication apparatus when an index based on the number of times of reception of the first notification satisfies a first condition;
      causing the first receiver of the communication apparatus to stop receiving the packet when the index based on a number of times of reception of the first notification satisfies the first condition; and
      causing the first receiver of the communication apparatus to resume receiving the packet after a predetermined time passes when the first receiver of the communication apparatus stops receiving the packet.

6. A first non-transitory computer readable medium storing a first program, the first program causing a first processor in a communication apparatus to execute:
   receiving a packet by a first receiver,
   processing the packet matching with a predetermined condition by a method associated with the predetermined condition, wherein the predetermined condition is defined by a flow table, and
   transmitting a first notification when the packet does not match with the predetermined condition; and
   a second non-transitory computer readable medium storing a second program, the second program causing a second processor in a communication control apparatus to execute:
   receiving the first notification by a second receiver of the communication control apparatus when the packet does not match with the predetermined condition,
   limiting rate reception of the packet in receiving the packet at the communication apparatus when an index based on the number of times of reception of the first notification satisfies a first condition,
   causing the first receiver of the communication apparatus to stop receiving the packet when the index based on the number of times of reception of the first notification satisfies the first condition, and
   causing the first receiver of the communication apparatus to resume receiving the packet after a predetermined time passes when the receiver of the communication apparatus stops receiving the packet.

* * * * *